AMPLITUDE MODULATION BROADCAST STEREOPHONIC SYSTEM

Filed Oct. 12, 1959 4 Sheets-Sheet 1

INVENTOR:
ROBERT B. DOME,
BY Donald N. Timbie
HIS ATTORNEY.

AMPLITUDE MODULATION BROADCAST STEREOPHONIC SYSTEM

Filed Oct. 12, 1959

INVENTOR:
ROBERT B. DOME,
BY Donald N. Timbie
HIS ATTORNEY.

INVENTOR:
ROBERT B. DOME,
BY Donald N. Timbie
HIS ATTORNEY.

INVENTOR:
ROBERT B. DOME,
BY Donald N. Timbie
HIS ATTORNEY.

United States Patent Office 3,068,323
Patented Dec. 11, 1962

3,068,323
AMPLITUDE MODULATION BROADCAST STEREOPHONIC SYSTEM

Robert B. Dome, Geddes Township, Onondaga County, N.Y., assignor to General Electric Company, a corporation of New York Filed Oct. 12, 1959, Ser. No. 845,695
6 Claims. (Cl. 179—15)

Figure 1:
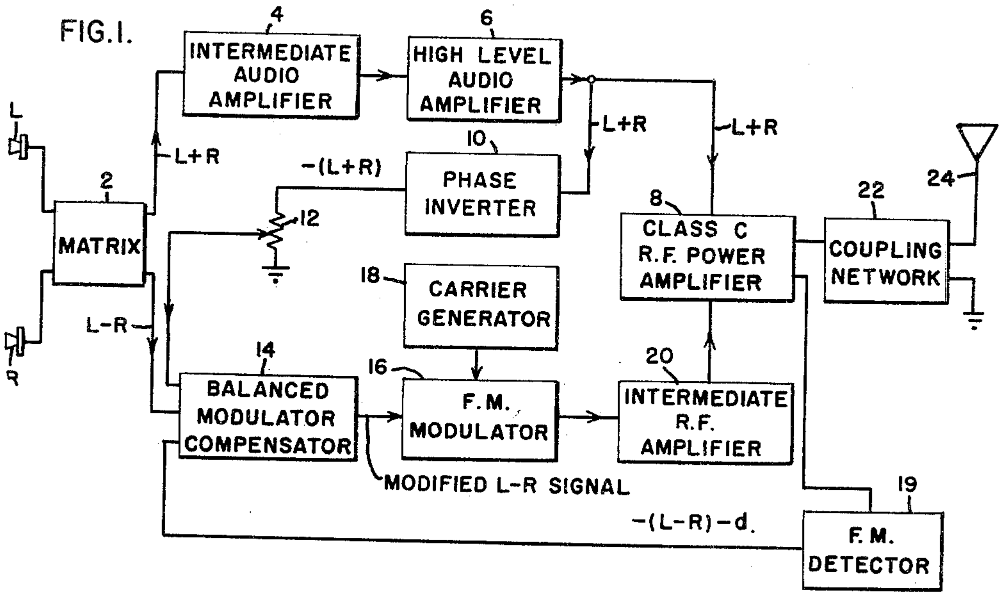

This invention relates to an improved system for transmitting and receiving stereophonic signals in an amplitude modulation system.

In a stereophonic system, two microphones L and R (left and right) are located at different points in a studio and means are provided for transmitting the signals provided by each microphone in such manner that the L and R signals may be separated at a receiver and applied to separate speakers. In this way a pleasing directional effect is produced.

Whatever method is used to transmit the L and R signals, it is highly advisable, if not essential, that the operation of standard amplitude modulation receivers not be impaired. In this regard it appears desirable that a standard amplitude modulation receiver reproduce both the L and the R signal as a valuable portion of the program might otherwise be lost. For example if one performer is close to the L microphone and another performer is close to the R microphone, a transmission of the type which permits a standard receiver to reproduce just the L signal would not provide its listeners with what is being said by the performer that is close to the R microphone.

In addition to the provision of compatibility with standard receivers, it is of course highly desirable that the nature of the transmission be such as to simplify the design of a special receiver capable of reproducing high quality stereophonic sound.

In order to meet the requirements just set forth, it has been proposed that the L and R signals be applied to a matrix having two outputs, one yielding the sum of the two applied signals $L+R$, and the other yielding their difference $L-R$. One of these signals, $L+R$, for example, is applied so as to amplitude modulate a carrier wave, and the other $L-R$ is applied so as to frequency modulate the carrier wave. If a standard amplitude modulation receiver is tuned to the mean carrier frequency, its audio output will correspond to the $L+R$ signal. Hence it will produce sounds applied to either microphone.

In order to produce stereophonic sound in response to this type of transmission, it would be necessary to provide two detectors, one like that of a standard amplitude modulation receiver to detect the amplitude modulation components representing the $L+R$ signal and the other to detect the frequency modulation components representing $L-R$ signal. The amplitude modulation components of the $L+R$ signal will affect the detection of the $L-R$ signal unless a limiter is inserted prior to the frequency modulation detector. The $L+R$ and $L-R$ signals are then applied to a matrix that isolates the L and R signals. However, a matrix requires that the relative amplitude levels of the $L+R$ and $L-R$ signals applied to it remain unchanged after it is once adjusted for proper operation. Accordingly, it is essential that the receiver have an extremely effective automatic gain control; otherwise the $L+R$ signal will vary in amplitude and interfere with the desired separation of the L and R signals. A receiver of such design is inherently expensive and is susceptible to undesirable operation.

It is accordingly an object of this invention to provide means for transmitting signals representing stereophonic sounds in the form of amplitude and frequency modulation components of such nature as to make possible the design of a high quality stereophonic receiver that is inherently less expensive than receivers of comparable quality designed for the reception of stereophonic signals provided by other transmitters.

Another object of the invention is to provide an improved transmitter for conveying the sum of two signals in the form of amplitude modulation components of a carrier wave, and their difference in the form of frequency modulation of the carrier wave in such manner as to permit the design of a less expensive receiver for detecting and separating the two signals.

It is another object of this invention to provide an improved means for transmitting two separate signals by amplitude modulation and frequency modulation of a carrier wave that permits the design of a receiver for separating the two signals that is inherently simple and inexpensive.

It is another object of the invention to provide a simple inexpensive circuit for deriving separate signals from frequency modulation and amplitude modulation components representing different combinations of them.

Still another object of the invention is to provide a relatively inexpensive system for conveying stereophonic signals from one point to another.

It is another object of this invention to provide a transmitter that produces a signal including frequency modulation components and amplitude modulation components of such nature that the frequency modulation components do not distort the signal recovered from the amplitude modulation components by an amplitude modulation receiver.

It is another object of this invention to provide in a simplified stereophonic receiver an improved means for deriving an automatic gain control voltage.

Still another object of this invention is to provide a simple inexpensive stereophonic receiver in which a single circuit detects and isolates two separate signals from a carrier wave that is amplitude modulated by their sum and frequency modulated by their difference, and which is provided with means for correcting any cross talk between the signals occurring as a result of the detected frequency modulation components having a different amplitude than the detected amplitude modulation components.

Other types of transmissions differing greatly from that briefly outlined above have been proposed, but some of them require a particular form of transmitter, for example a transmitter having class B linear amplifiers, and hence are not useable with the many transmitters having class C plate modulators. The transmission of this invention has the advantage of being capable of using any type of amplifier or modulator, and hence its installation would require no changes to the expensive power amplifiers and modulators of the various transmitters in service.

A simplified explanation of one way in which the objectives and advantages may be achieved in accordance with this invention is as follows. It will be recalled that in the assumed example, the $L-R$ signal was used in unmodified form to cause frequency modulation of the carrier. I propose that the $L-R$ signal be modified prior to its application to the means for producing frequency modulation of the carrier wave. The modification is such as to increase the frequency deviation of the carrier wave when its amplitude is decreased by amplitude modulation produced by the $L+R$ signal and vice versa. At the receiver, circuits having resonant peaks on either side of the intermediate carrier frequency are respectively coupled to separate amplitude modulation detectors which respectively provide the L and R signals. No limiter and no matrix as such are required. As will be subsequently explained, such a simplified receiver would produce, in response to a transmission in which the $L-R$ signal is not modified, L and R signals having considerable cross talk. However, when the $L-R$ signal is modified, a receiver of this invention may be used.

Figure 2:
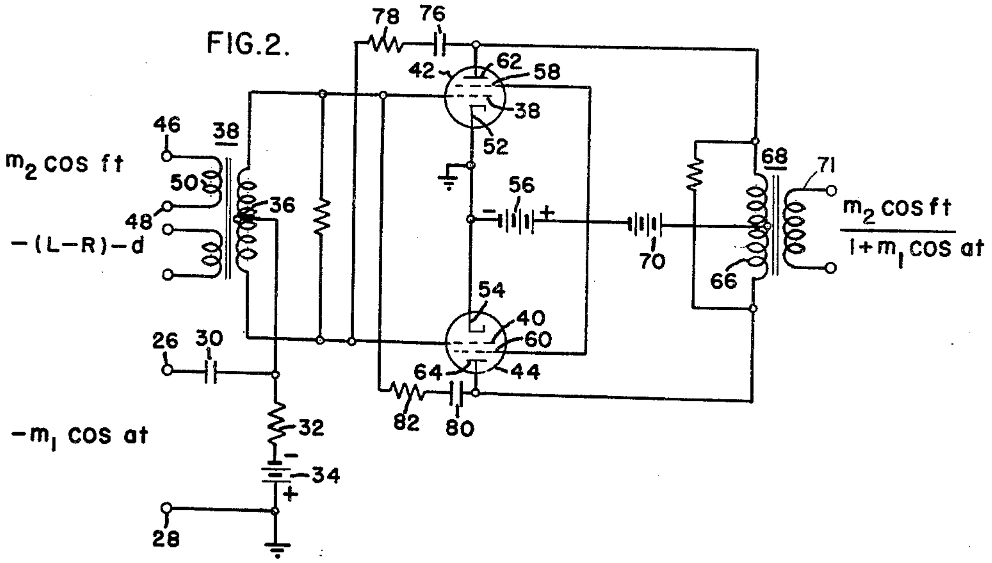
Figure 4:
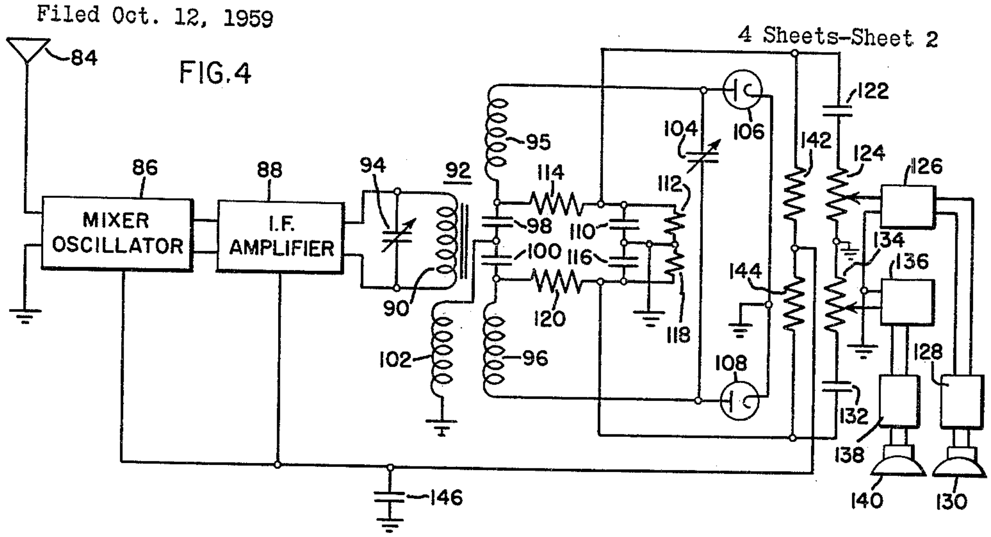
Figure 5:
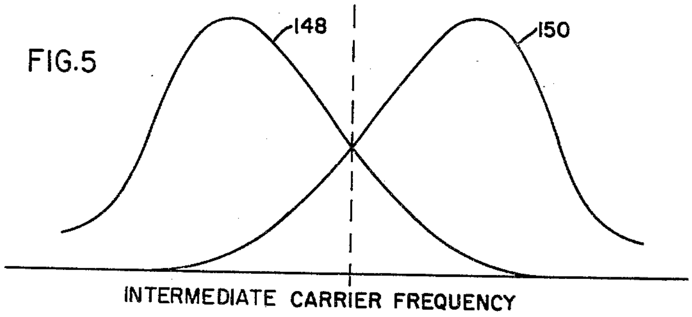
Figure 3:
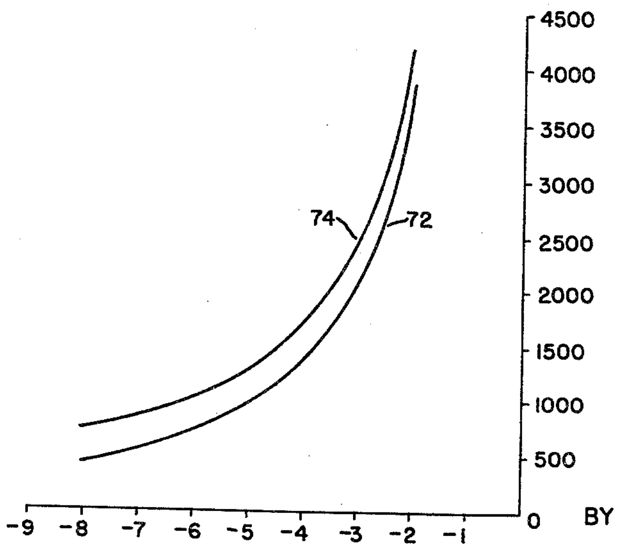
Figure 6:
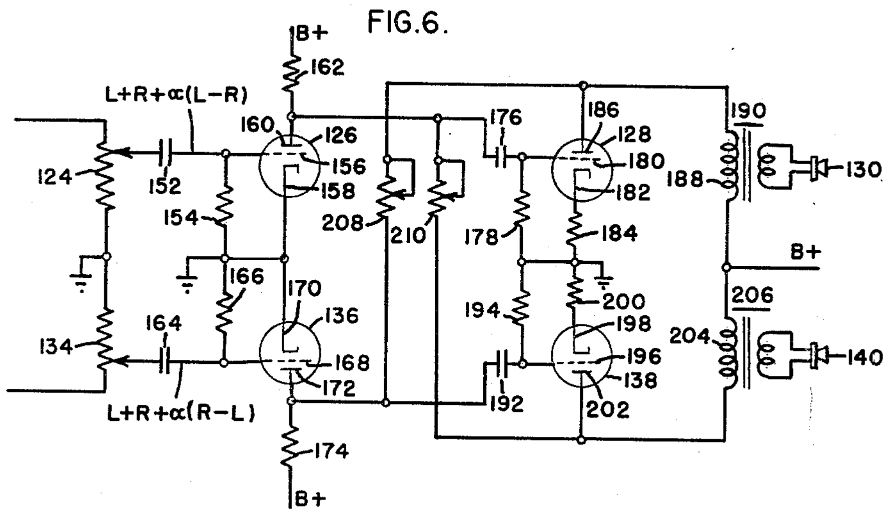
Figure 7:
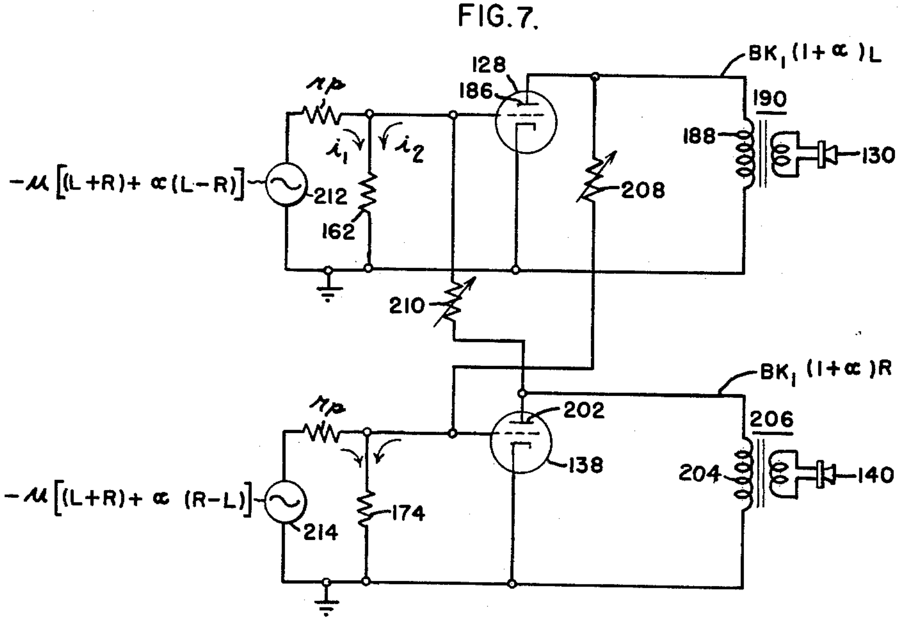
Figure 8:
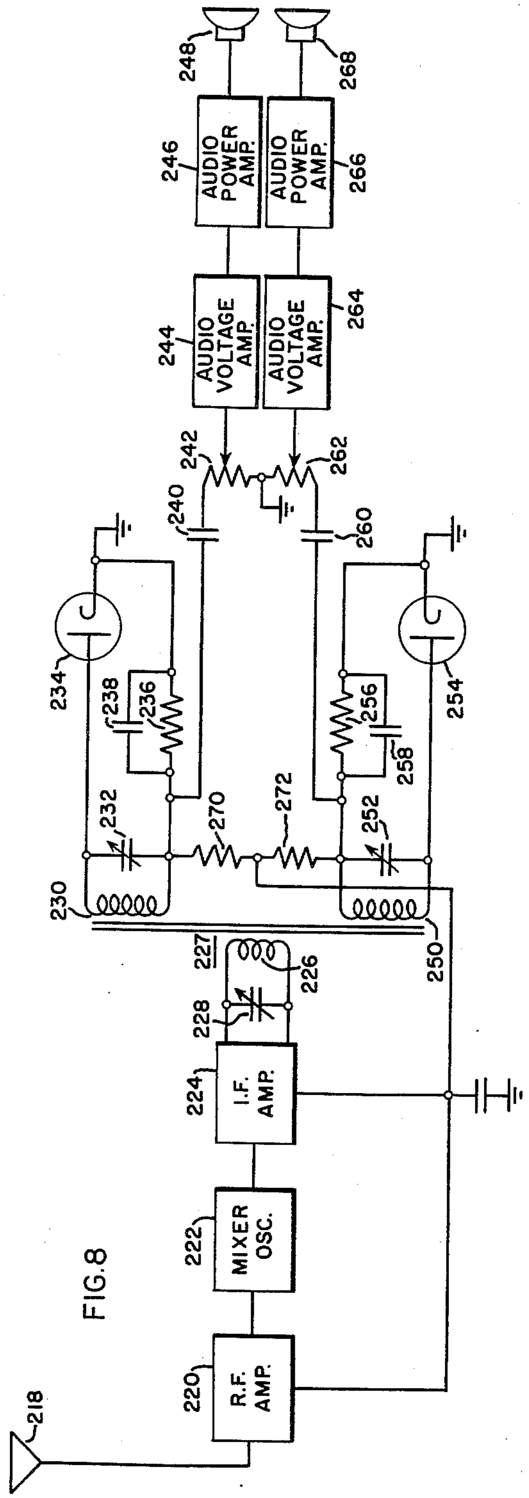
Figure 11:
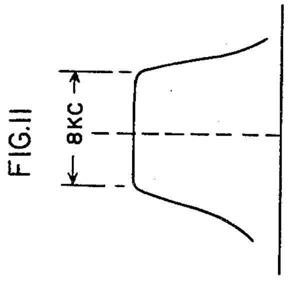
Figure 10:
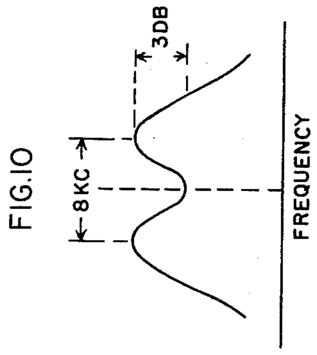
Figure 9:
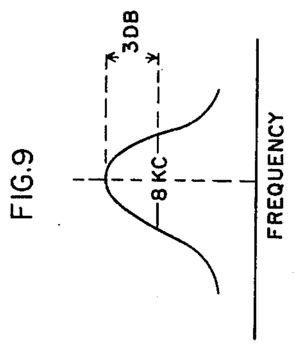

The manner in which the above objective and advantage may be attained in accordance with this invention will become clear after consideration of the following discussion taken in conjunction with the drawings which:

FIGURE 1 is a block diagram of a transmitter embodying this invention,

FIGURE 2 illustrates a balanced modulator for use in the transmitter of FIGURE 1, FIGURE 3 is a graph illustrating certain characteristics of the modulator of FIGURE 2, FIGURE 4 is a schematic diagram of the simplified receiver that may be used in conjunction with the transmitter of FIGURE 1, FIGURE 5 is a graph representing certain characteristics of the receiver circuit of FIGURE 4, FIGURE 6 is a schematic diagram of a circuit for cross feeding the L and R audio channels, FIGURE 7 is an equivalent circuit of FIGURE 6 presented for purposes of explanation, FIGURE 8 is a schematic diagram of a different form of the receiver of this invention, and FIGURES 9–11 are graphs of frequency response characteristics illustrating the manner in which a coupling network of this invention renders the transmitted signal more compatible for existing amplitude modulation receivers.

Reference is now made to FIGURE 1 wherein the output of microphones L and R are applied to a matrix 2 which provides in a well known manner output signals $L+R$ and $L-R$. The $L+R$ signal is applied to an intermediate audio amplifier 4 and further amplification may be provided by a high level audio amplifier 6 before the $L+R$ signal is applied to modulate the plate (not shown) of a class C radio frequency power amplifier 8. The $L+R$ signal appearing at the output of the amplifier 6 is inverted by phase inverter 10 so as to form a $-(L+R)$ signal, a suitable portion of the $-(L+R)$ signal is selected by a potentiometer 12 and applied to a balanced modulator compensator 14. The $L-R$ signal provided by the matrix 2 is also applied to the balanced modulator compensator 14. In a manner well known to those skilled in the art, modulator 14 is arranged to balance out any components of the $-(L+R)$ signal with the result that only the $L-R$ signal modified in a manner to be explained is applied to a frequency modulation modulator 16 in such manner as to vary the frequency of a carrier provided by a generator 18. After amplification by an intermediate radio frequency amplifier 20, the output of the modulator 16 is applied so as to activate the power amplifier 8. In the class C radio frequency power amplifier 8, the frequency modulated carrier provided by the amplifier 20 is amplitude modulated by the $L+R$ signal. A coupling network 22 is connected between the power amplifier 8 and an antenna 24.

FIGURE 9 illustrates the frequency response characteristic of present amplitude modulation receivers. With a response of this nature, the frequency modulation components of the $L-R$ signal, as long as it is represented by angle modulation components, will distort the output of the receiver. This can be avoided in accordance with this invention by using a coupling circuit 22 having a frequency response characteristic such as illustrated in FIGURE 10. Over coupled resonant circuits or other means well known to those skilled in the art may be used. When this is done, the overall frequency response of the transmitter and amplitude modulation receiver will be as indicated in the graph of FIGURE 11. The flat top of the graph of FIGURE 11 means that F.M. modulation will not be detected since detection of F.M. modulation components requires a sloping response characteristic.

In order to eliminate any distortion present in the $L-R$ signal as represented by the frequency modulation components of the carrier wave at the output of the modulator-amplifier 8, a wide band frequency modulation detector 19 may be connected to the output of the amplifier 8 so as to derive therefrom in a manner well known to those skilled in the art a signal represented by the expression $-(L-R)-d$ wherein $d$ represents the distortion present. Such a distortion might be present for various reasons, but as will be clear from subsequent discussion, distortion might be introduced if the characteristics of the balanced modulator compensator 14 were not precisely those desired. The signal $-(L-R)-d$ is applied in a degenerative manner to the input of the compensator 14.

Analysis of a receiver such as shown in FIGURE 4 showns that if the $L-R$ signal were not modified prior to its application to the modulator 16, i.e. if it were applied directly, the $L-R$ signal is contaminated by the audio from the $L+R$ signal so as to produce a cross talk component that may be represented by the expression $$e=(1+m_1 \cos at)(m_2 \cos ft)$$

where $m_1 \cos at$ refers to the $L+R$ signal in the form of an amplitude modulation $m_2 \cos ft$ refers to the frequency modulation component $L-R$. In accordance with this invention the $L-R$ signal is modified by the modulator 14 so as to produce an output signal represented by the expression $$\frac{m_2 \cos ft}{1+m_1 \cos at}$$

This type of modification of the $L-R$ signal can be effected by various means, but one that is suitable for the purpose is illustrated in FIGURE 2 wherein the $-(L+R)$ signal represented by the expression $$-m_1 \cos at$$

is applied between terminal 26 and grounded terminal 28. A coupling capacitor 30, a resistor 32 and a bias source, herein indicated as a battery 34, are connected between the terminal 28 and ground. The junction of the capacitor 30 and the resistor 32 is connected to a center tap 36 of a secondary winding of a transformer 38. The ends of the secondary winding are connected to control grids 38, 40 of pentodes 42 and 44 respectively. The $L-R$ signal represented by the expression $m_2 \cos ft$ is applied between terminals 46, 48 of a primary winding 50 of the transformer 38. Hence it is seen that the $-(L+R)$ signal or $-m_1 \cos at$ is applied to the grids 38 and 40 in like phase or in what is called push-push, and the $L-R$ signal or $m_2 \cos ft$ is applied to these same grids in opposite phase or what is called push-pull.

The cathodes 52, 54 are both grounded, and a battery 56 or other suitable source of direct current potential is connected between ground and the screen grids 58, 60 so as to apply a suitable positive potential thereto. Anodes 62, 64 are connected to respectively opposite ends of a primary winding 66 of transformer 68. Suitable positive operating potential may be supplied to the anodes 62, 64 by connecting a battery 70 between the screen grids 58, 60 and a center tap on the primary winding 66. If the non linearity of the amplifier 42, 44 is proper, the desired signal $$\frac{m_2 \cos ft}{1+m_1 \cos at}$$

appears across a secondary winding 71 of the transformer 68. It is to be noted that this expression does not include a term $m_1 \cos at$.

A study of the expression for the desired output shows that the limits of $m_1$ must be restricted in a practical system because if $m_1=1$, for example, the output signal would be infinite (neglecting the saturation of the amplifiers 42, 44) for those instants when cos $at=-1$, a condition which occurs at one peak of the signal $-(L+R)$. Mathematically, then, this would require the frequency modulator 16 of FIGURE 1 to swing the carrier by an infinite amount, which is, of course, impossible. If this transmitter is to be used in an amplitude modulation system operating within the present F.C.C. standards, the swing should be limited to some practical maximum such as ±4000 cycles per second.

Assume that the deviation in carrier frequency produced by the unmodified $L-R$ signal, $m_2$ cos $ft$ is ΔF. This deviation will be increased if the denominator, $1+m_1$ cos $at$, is a fraction because the modified signal $L-R$ is larger in amplitude. For portions of the cycle of the applied $-(L+R)$ signal when cos $at$ is negative, the denominator is a fraction and the fraction is the smallest when cos $at=-1$ for any value of $m_1$. Therefore if we divide ΔF by $1-m_1$ and equate it to 4000, the maximum permissible swing, and assign fractional values to $m_1$ we will determine the actual deviation ΔF produced by the $L-R$ components for each value of $m_1$ when the value of cos $at$ is zero, or when there is an absence of A.M. modulation. On the other hand when cos $at$ is positive, as during the other half cycle of $-(L+R)$, the denominator $1+m_1$ cos $at$ is greater than unity, and the $L-R$ signal, and consequently the frequency deviation being produced by the modulator 16, are both reduced. The smallest swing occurs when cos $at=+1$, and may therefore be represented by the expression $$\frac{\Delta F}{1+m_1}$$

but inasmuch as it has just been determined by analysis of the maximum frequency swing conditions that $$\Delta F=4000(1-m_1)$$

the expression for minimum frequency swing is, by substitution for ΔF, $$\frac{4000(1-m_1)}{1+m_1}$$

The following table shows the results of calculations based on an assumed maximum frequency swing of ±4000 cycles per second as a function of the maximum value $m_1$.

| Max $m_1$ | Max swing when cos $at=-1$ | Swing when cos $at=0$ | Min swing when cos $at=1$ |
|---|---|---|---|
| 0.99 | 4,000 | 40 | 20.1 |
| 0.95 | 4,000 | 200 | 102.5 |
| 0.90 | 4,000 | 400 | 210 |
| 0.85 | 4,000 | 600 | 324 |
| 0.80 | 4,000 | 800 | 444 |
| 0.75 | 4,000 | 1,000 | 571 |
| 0.70 | 4,000 | 1,200 | 706 |
| 0.65 | 4,000 | 1,400 | 850 |
| 0.60 | 4,000 | 1,600 | 1,000 |
| 0.55 | 4,000 | 1,800 | 1,160 |
| 0.50 | 4,000 | 2,000 | 1,333 |
| 0.45 | 4,000 | 2,200 | 1,517 |
| 0.40 | 4,000 | 2,400 | 1,715 |

Analysis of the table indicates that $m_1$ should probably be limited to about .70 in a practical system, because higher values of $m_1$ cause the average frequency swing caused by the $L-R$ signal (where cos $at$ =0) to become so small that the frequency modulation channel will become too noisy.

Another limitation on the selection of the coefficient $m_1$, from a practical point of view, is determined by the limiting performance of the balanced modulator. Whereas it is conceivable that the value of $m_1$ could vary widely if special tubes are used for the amplifiers 42, 44 of FIGURE 2, the following analysis is based on the known characteristics of a 6BA6 remote cut-off pentode.

Before proceeding with the detailed analysis, however, it would be well to understand the general operation of the balanced modulator. Curve 72 of the graph of FIGURE 3 illustrates the transconductance characteristic of a 6BA6 tube. Whatever grid bias is provided by the battery 34, it will be noted that if the $L-R$ signal ($m_2$ cos $ft$) is of sufficiently small amplitude, substantially linear operation will obtain and the output current will therefore conform to the $L-R$ voltage. Because the modulator is balanced for the $-(L+R)$ signal ($-m_1$ cos $at$), its amplitude can have any value as it does not appear directly in the output of the transformer 68. Its only effect is to add to or subtract on an instantaneous basis from the bias provided by the battery 34 so as to cause the $L-R$ signal ($m_2$ cos $ft$) to produce a less or greater change, respectively, in the alternating current output. For example, during negative half cycles of $-m_1$ cos $at$, the effective or instantaneous bias is increased, and the change in plate current corresponding to the $L-R$ signal can be seen from the curve 72 of FIGURE 3 to be reduced as the slope of the curve decreases as the bias increases. During positive half cycles the effective or instantaneous bias is reduced with the result that the changes in plate current corresponding to $L-R$ are greater because the slope of the curve increases as the bias decreases.

It will be noted that bias is varied in accordance with the $-(L+R)$ signal $-m_1$ cos $at$ and that it is therefore out of phase with the $L+R$ signal. Hence, when the $L+R$ signal increases the amplitude of the frequency modulated carrier wave, the instantaneous bias on the tubes 42, 44 is increased with the result that the frequency deviation of the $L-R$ signal is reduced from what it would otherwise be. The reason for this relationship will be discussed in detail in connection with FIGURE 4.

From the foregoing explanation of the operation of the modulator of FIGURE 2, it is apparent that if the curve 72 of FIGURE 3 were of such shape about a selected bias point provided by the battery 34 as to conform to expression $$\frac{1}{1+m_1 \cos at}$$

the amplitude of the $L-R$ signal $m_2$ cos $ft$ and hence the frequency swing it produces would be that which is desired. For example, if the bias provided by the battery 34 were −5 volts, the transconductance determined from the curve 72 is seen to be 1000. Now if $m_1$ is selected for reasons previously discussed to be 0.70, it can be seen from the table supra that the frequency swing produced by the L−R signal at a time when the $-(L+R)$ is going through zero value is 1200. Now if the amplitude of the $-(L+R)$ signal $-m_1$ cos $at$ is such as to swing the grid bias voltage from −8 volts to −2 volts, a minimum frequency swing of 706 should be produced by the $L-R$ signal at the −8 volt point and a maximum frequency swing of 4000 should be produced at the −2 volt point. At −8 volts, however, the transconductance is 450 and at −2 volts it is 4000, and since the output $L-R$ signal of the modulator is in the same ratio, it is seen that, if a frequency swing of 1200 is achieved at a transconductance of 1000, a frequency swing of 540 would occur at −8 volts and a swing of 4800 would occur at −2 volts. Hence the shape of the curve 72 is not correct.

Assume, however, that the tubes 42, 44 have a transconductance characteristic as indicated in curve 74 of FIGURE 3. At −5 volts, the transconductance is 1325, at −8 volts it is 770 and at −2 volts it is 4321, and frequency deviations of the same ratio will be produced corresponding to $L-R$. It is seen that the ratio $$\frac{4321}{1325}=3.27$$

has very nearly the same value as $$\frac{4000}{1200}=3.33$$

and that the ratio $$\frac{770}{1325}=0.58$$

has very nearly the ratio of $$\frac{706}{1200}=0.59$$

As can easily be determined, the corresponding ratios would be identical if the steady bias provided by the battery 34 were −5.05 volts and voltage swing of the $-(L+R)$ signal ($m_1$ cos $at$) were 3.05 volts, for at −5.05 volts the transconductance is 1295, at −2 volts it is 4321, and at −8.10 volts it is 762. It can be seen that $$\frac{4321}{1295} \text{ is } 3.33$$

and that the desired ratio is $$\frac{4000}{1200}=3.33$$

and further that $$\frac{762}{1295}=.59$$

whereas the desired ratio is $$\frac{706}{1200}=.59$$

From the foregoing it is seen that the curve 74 has the desired values at its mid and end points. However more calculation for intermediate points show that the curve 74 has the desired characteristic. Now curve 74 was obtained by numerically adding a constant conductance of 321 micromhos to the tube curve 72 for all values of grid bias. This mathematical manipulation must therefore be translated into an equivalent electrical circuit change.

As is well known to those skilled in the art, tube characteristics vary from tube to tube, and it is therefore entirely possible that the curvature of the transconductance characteristic 72 of FIGURE 3 might vary from tube to tube. This would cause the output of the balanced modulator compensator 14 to be distorted. Such distortion can be practically eliminated by applying a $-(L-R)-d$ signal as previously suggested in the discussion of FIGURE 1. Various ways of inserting this correction signal may be used, as for example applying it to a suitably polarized auxiliary primary winding 69 of the transformer 38 of FIGURE 2. Actually, the signal provided by the wide band F.M. detector 19 of FIGURE 1 could provide a signal $(L-R)+d$ and the necessary inversion of phase could be accomplished by choosing a proper polarity of the auxiliary winding 69.

Various ways are known for increasing the transconductance characteristic of the amplifiers. In FIGURE 2 this is accomplished by connecting a blocking capacitor 76 in series with a resistor 78 between the plate 62 of the amplifier 42 and the grid 40 of the amplifier 44 and by connecting a blocking capacitor 80 and a resistor 82 in series between the anode 64 of the amplifier 44 and the grid 38 of the amplifier 42. It can be seen inasmuch as the signal voltage at the grid 40 is in phase with the signal voltage at the plate 62 that more signal current flows in the plate circuit of the amplifier 42, the amount being determined by the value of the resistor 78. The transconductance of the amplifier 44 is augmented in a similar manner by the capacitor 80 and resistor 82.

Reference is now made to FIGURES 4 and 5 for an explanation of the operation of one form of a receiver of a type that is adapted to reproduce streophonic information transmitted by a transmitter of the type shown in FIGURE 1. An antenna 84 picks up the radiated amplitude and frequency modulated carrier wave and applies it to a mixer oscillator 86, which in any well known manner provides an intermediate frequency to an intermediate frequency amplifier 88. A primary winding 90 of transformer 92 is coupled to the output of the amplifier 88 and is tuned to resonance at the central intermediate frequency by a variable capacitor 94. In this particular circuit, the secondary of the transformer 92 is comprised of two separate windings 95 and 96, the inner ends of which are connected by series capacitors 98 and 100 of such value as to provide a low impedance for the intermediate frequency. A tertiary winding 102 is connected between ground and a point between the capacitors 98, 100. Parallel resonance of the secondary windings 95, 96 is achieved by a variable capacitor 104 connected between their outer ends. It will be observed by those skilled in the art that, in so far as has been described, the transformer 92 resembles a discriminator type transformer used in frequency modulation receivers.

Unilateral conducting devices such as diodes 106 and 108, are connected in series with opposite polarity between the outer ends of the secondary windings 95, 96, and the cathodes thereof are grounded. The load circuit for the diode 106 is comprised of a parallel capacitor 110 and resistor 112, and, as is customary in detection circuits, has a time constant such that the circuit has very low impedance for the intermediate carrier frequencies and a relatively high impedance for the audio frequencies. In order to complete the D.C. path for the diode 106, the ungrounded ends of the capacitor 110 and resistor 112 are connected via an isolating resistor 114 to a point between the lower end of the secondary winding 95 and the capacitor 98. The load circuit for the diode 108 is comprised of a parallel capacitor 116 and resistor 118, having a time constant as set forth above, and connected between ground and one end of another isolating resistor 120, the other end of the latter resistor being connected between the capacitor 100 and the lower secondary winding 96.

Audio output voltages detected by the diode 106 appear at the ungrounded side of the load circuit 110, 112 and are coupled via a blocking capacitor 122 to a potentiometer 124, the lower end of which is grounded. A desired amount of the L signal is obtained by adjusting the arm of potentiometer 124 and is applied via a voltage amplifier 126 and a power amplifier 128 to a loudspeaker 130. In a similar manner the signal detected by the diode 108 that appears on the ungrounded side of the load circuit 116, 118 is coupled via a blocking capacitor 132 to a potentiometer 134 and thence via a voltage amplifier 136 and a power amplifier 138 to a loudspeaker 140 to produce a desired amount of R signal.

Automatic volume control voltage may be attained at the junction of two relatively large resistors 142, 144 connected in series across the load outputs and applied to various stages of the receiver after integration by a capacitor 146.

The operation of the receiver of FIGURE 4 will now be explained with the aid of the graphs of FIGURE 5 wherein curve 148 represents the response characteristic of the detector circuit including the diode 106 and the curve 150 represents the response characteristic of the detector circuit including the diode 108. The peaks are adjusted to be 4 to 20 kilocycles apart by the initial design of the transformer 92. The detected amplitude modulation components of the $L+R$ signal appear at the ungrounded sides of the load circuits 110, 112 and 116, 118 in like polarity and equal amplitudes, whereas the detected frequency modulation components of the modified $L-R$ signal appear at the ungrounded sides of the load circuits 110, 112 and 116, 118 with opposite polarities owing to the opposite slopes of the response characteristics 148, 150. Hence at the ungrounded side of the load circuit 110, 112 a signal $$(L+R)+(L-R)=2L$$

appears and at the ungrounded side of the load circuit 116, 118 a signal $(L+R)-(L-R)=2R$ appears. The left and right signal channels are thereby entirely separated.

The reason for the insertion of the balanced modulator 14 in FIGURE 1 and the consequent modification of the $L-R$ signal prior to its application to the F.M. modulator 16 may be explained by examining the operation of a system in which the $L-R$ signal is not modified, but is applied directly to the F.M. modulator 16. In such an arrangement the $L+R$ signal, assuming for analysis that it is a cyclic wave, increases the amplitude of the frequency modulated components provided by the F.M. modulator 16 during one half cycle, which half depending on the nature of amplitude modulator 8, and decreases it during the next. At a receiver of the type shown in FIGURE 4 wherein the amplitude modulation and frequency modulation components are detected by the same circuitry, and whereas there is therefore no limiter, such changes in amplitude cause proportionate changes in the detected $L-R$ signal so that the resulting cross talk may be represented by the expression.

$$(1+m_1 \cos at)(m_2 \cos ft)$$

Compensating correction is attained in the transmitter of this invention by increasing the $L-R$ signal amplitude and hence the frequencey deviation produced by the modulator 16 when the $L+R$ signal decreases the amplitude of the transmitted carrier. In this way the $L-R$ signal received at the receiver will be unaffected by the $L+R$ signal. Hence the transmitter of this invention permits the use of receivers not having a limiter, whether they are like that shown in FIGURE 4 or not. It is obviously better from an economic point of view to add a rather small expense to a few transmitters than to make it neecssary for millions of receivers to have a limiter.

From the previous discussion of the receiver of FIGURE 4 it can be seen that the signals across the potentiometer 124 and 134 will be 2L and 2R respectively only under the condition that the L and R components of the $L+R$ signal, derived by amplitude modulation detection, and the $L-R$ signal, derived by frequency modulation detection are equal in magnitude. The amplitude of the $L-R$ signal and hence the L and R components of this signal can be increased by designing the transformer 92 of FIGURE 4 so as to decrease the separation of the peaks of the curves 148, 150 shown by way of example in FIGURE 5. When this is done, however, it will lessen the frequency response or fidelity of the $L+R$ signal.

Accordingly it is suggested in accordance with this invention that the transformer 92 or its equivalent be designed so as to separate the peaks of the response by at least a sufficient amount as to yield a good $L+R$ signal. This would mean that the peaks should be separated by 10 or 12 kilocycles. However, in order that the fidelity of the $L-R$ signal be improved, it may be desirable that the peaks be separated by as much as 20 kilocycles.

In accordance with this invention, any resulting cross talk can be minimized or eliminated by providing means for cross feeding from the L audio channel to the R audio channel and cross feeding from the R audio channel to the L audio channel. One way of accomplishing this result is illustrated in FIGURE 6 wherein, under the assumed conditions, the signal at the output of the potentiometer 124 may be represented by the expression $L+R+\alpha(L-R)$ and the signal at the output of the potentiometer 134 may be represented by the expression $L+R+\alpha(R-L)$, wherein $\alpha$ is a fraction representing the relative amplitude of the $L-R$ signal to the $L+R$ signal. It is observed that if $\alpha<1$ the R components no longer cancel out so as to produce the signal 2L at the potentiometer 124 and that similarly the L components do not cancel out so as to produce a signal 2R at the potentiometer 134.

The $L+R+\alpha(L-R)$ signal is applied via a coupling capacitor 152 and a grid leak resistor 154 to the grid 156 of the voltage amplifier 126, the cathode 158 being connected to ground, and the anode 160 being connected to B+ via an anode load resistor 162. In a similar manner the $L+R+\alpha(R-L)$ signal is coupled via a capacitor 164 and a grid leak resistor 166 to the grid 168 of the voltage amplifier 136, the cathode 170 being grounded and the anode 172 being connected to B+ via an anode load resistor 174. A coupling capacitor 176 and grid leak resistor 178 couple the signals at the anode 160 to the grid 180 of the power amplifier 128, the cathode 182 being biased by a cathode resistor 184 connected to ground. The anode 186 of the power amplifier is connected to B+ via a primary 188 of an audio output transformer 190 that energizes the loudspeaker 130. Similarly a capacitor 192 and grid leak resistor 194 couple the signal at the anode 172 to the grid 196 of the power amplifier 138, the cathode 198 being biased by a cathode resistor 200 connected to ground. The anode 202 is connected to B+ via a primary winding 204 of an audio output transformer 206 that energizes the loudspeaker 140. The circuitry just described is in accordance with normal practice and may assume different forms from the particular one shown.

One way of providing the cross feeding between the audio channels so as to realize the benefits of this invention is to connect a resistor 208 which may be variable, between the anode 186 of the power amplifier 128 in the L audio channel to the anode 172 of the voltage amplifier 136 in the R audio channel, and to connect a resistor 210, which may be variable, between the anode 202 of the power amplifier 138 in the R audio channel to the anode 160 of the voltage amplifier 126 in the L audio channel. If the resistors 208 and 210 have the correct values, only L signal will energize the loudspeaker 130 and only an R signal will energize the loudspeaker 140.

The operation of the particular circuit shown in FIGURE 6 will now be explained with the aid of the equivalent circuit of FIGURE 7 wherein components corresponding to those of FIGURE 6 are designed by the same numerals. As is customary the voltage amplifier 126 is represented by a voltage source 212 and a resistor $rp$, the plate resistance of the amplifier 126, and in a similar manner the voltage amplifier 136 is represented by a voltage source 214 and a resistor $rp$. The voltage of the source 212 is $-\mu[(L+R)+\alpha(L-R)]$ and the voltage of the source 214 is $-\mu[(L+R)+\alpha(R-L)]$, wherein $\mu$ represents the voltage amplification factor of the amplifier 126 and 136 and the minus sign indicates the reversal in polarity.

Two currents are made to flow through the plate resistor 162 $i_1$ by the source 212 and $i_2$ by the voltage at the anode 202 of the power amplifier 138. Let the voltage produced by $i_1$ across the resistor 162 be $$e_1=\mu K_1[(L+R)+\alpha(L-R)]$$

wherein $K_1$ is a constant taking into account the voltage division between $rp$ and the resistor 162. Now it is desired that the output of the power amplifier 128 be devoid of R terms and hence it can be represented by the expression $\mu BK_1(1+\alpha)L$ wherein B represents the voltage gain of the power amplifier 128, the expression being positive because of the usual reversal in polarity effected by the amplifier 128. In a similar manner the desired output of the power amplifier 138 can be shown to be $\mu KB_1(1+\alpha)R$, which for convenience will be designated as YR, and wherein $K_2$ is a constant indicating the fractional amount of the voltage at the anode 202 that appears across the resistor 162.

Superposition of the voltages $e_1$ and $e_2$ will produce a net voltage across the resistor 162 as follows:

$$e_1+e_2=\mu K_1[(L+R)+\alpha(L-R)]+YR$$
$$=-\mu K_1(1+\alpha)L+[Y-\mu K_1(1-\alpha)]R$$

It is desired that the coefficient of R be equal to zero and therefore setting it equal to zero, $$Y-\mu K_1(1-\alpha)=0$$

and solving for Y, $$Y=\mu K_1(1-\alpha)$$

Now by substituting for Y we obtain $$\mu K_2BK_1(1+\alpha)=\mu K_1(1-\alpha)$$

and accordingly, solving for $K_2$, $$K_2=\frac{1-\alpha}{B(1+\alpha)}$$

By way of an illustrative example is we let $\alpha=0.2$ and $B=10$, then $$K_2=\frac{0.8}{10(1.2)}=0.067$$

Inasmuch as B is the voltage gain of the power amplifier 138 and $K_2$ is the fraction of the voltage at the anode 202 that must be made to appear across the resistor 162, the calculation above indicates that this fraction is $1/15$, and hence very little power is taken from the amplifier 138. Calculations of the cross feed from the L channel into the R channel are the same and hence pure L and R signals are applied to the speakers 130 and 140 respectively. Their amplitudes will be less with the values just given, the voltage at the anode 186 being $BK_1(1+0.2)L=1.2BK_1L$, whereas if the detected $L+R$ and $L-R$ signals were of the same amplitude the expression would be $2BK_1L$.

FIGURE 8 illustrates another form that the receiver of this invention may assume. The signal of a type transmitted by the transmitter of FIGURE 1 is picked up by an antenna 218, amplified by a radio frequency amplifier 220 and converted to an intermediate frequency by a mixer oscillator 222. An intermediate frequency amplifier 224 is coupled to the output of the mixer 222 and its output appears at a primary winding 226 of a transformer 227 that is tuned for resonance at the intermediate carrier frequency by a variable capacitor 228. A first secondary winding 230 of the transformer 227 is tuned to resonance on one side of the carrier frequency by a variable capacitor 232. The voltages appearing across the first secondary winding 230 are detected by connecting a diode 234 and a load circuit comprised of a resistor 236 in parallel with a capacitor 238 in series across the ends of the first secondary winding 230. The cathode of the diode is grounded and the anode is connected to the upper end of the first secondary winding 230. The voltage across the load circuit 238, 236 is coupled by a capacitor 240 to a potentiometer 242. The output at the tap on the potentiometer 242 is applied via an audio voltage amplifier 244, and power amplifier 246 to a loudspeaker 248.

A second secondary winding 250 of the transformer 227 is tuned by a variable capacitor 252, and its output is detected by a diode 254 and a load circuit comprised of a resistor 256 and capacitor 258 connected as shown. The cathode of the diode 254 is grounded. The detected output is coupled by a capacitor 260 to a potentiometer 262 and applied via a voltage amplifier 264 and a power amplifier 266 to a loudspeaker 268.

Automatic volume control voltage may be obtained at the junction of two relatively large resistors 270 and 272 connected in series between the outputs of the loads 236, 238 and 256, 258. After the audio components are removed by a filter capacitor 274, the voltage is applied to amplifying stages of the receiver.

The operation of the receiver of FIGURE 8 is similar to the operation of the receiver in FIGURE 4. The amplitude modulation components representing the $L+R$ signal appear at the output of both load circuits and the $L-R$ signal represented by the frequency modulation components appears at the output of the load circuit 236, 238 as $L-R$ and at the output of the load circuit 256, 258 as $-(L-R)$. As before the summation of these signals at the output of the load circuit 236, 238 yields 2L and the summation of these signals at the output of the load circuit 256, 258 yields 2R. If for reasons previously explained the $L-R$ signal is not recovered with the same amplitude as the $L+R$ signal the potentiometers 242 and 262 can be coupled to a circuit like that shown in FIGURE 6 which includes means for cross feeding between the two audio channels.

In FIGURE 4 the transformer 92 and its tuning capacitors, and in FIGURE 8 the transformer 227 and its tuning capacitors may be described by the term frequency discriminator, and it is intended that this term apply to other devices having separate output frequency response characteristics as illustrated by curves 148 and 150 of FIGURE 5.

While I have illustrated a particular embodiment of my invention, it will of course be understood that I do not wish to be limited thereto, since various modifications can be made and I contemplate by the appended claims to cover all such modifications as come within the true spirit and scope of my invention.

What I claim and desire to secure by Letters Patent of the United States is:

1. A transmission system comprising means for deriving a first and second audio signals, means for providing a summation of the first and second signals at one output and the difference between the first and second signals at another output, means for amplitude modulating a carrier wave in accordance with the summation of the signals, means for modulating the frequency of the carrier wave in accordance with a modified difference of the signals, modifying means causing the amplitude of the difference between said first and second signals to vary inversely as the amplitude of the carrier wave, a frequency modulation discriminator having an input and two outputs, means for energizing said input in response to said carrier wave and its modulation components, first means for separately detecting the amplitude variations of the modulation components appearing at one output of said discriminator, and second means for separately detecting the amplitude variations of the modulation components appearing at the other output of said discriminator, a first loudspeaker coupled so as to be energized by said first detecting means and a second loudspeaker coupled so as to be energized by said second detecting means.

2. A system for transmitting stereophonic signals L and R comprising a matrix for producing from the L and R signals an $L+R$ signal and an $L-R$ signal, means for amplitude modulating a carrier wave in accordance with the $L+R$ signal, a balanced modulator having two inputs and an output, means for coupling the $L-R$ signal to one of said inputs, and means for applying a $-(L+R)$ signal to the other input so as to modulate the amplitude of the $L-R$ signal in accordance therewith and produce a modified $L-R$ signal at said output, means coupled to the output of said balanced modulator for modulating the frequency of the carrier wave in accordance with the modified $L-R$ signal, means for transmitting the carrier wave and its modulation components, means for receiving the carrier wave and its modulation components, means coupled to said receiving means for reducing the frequencies of the carrier wave and its modulation components to an intermediate level, a frequency discriminator coupled to the output of said receiving means, said discriminator having first and second outputs, a first amplitude modulation detecting means coupled to said first output of said discriminator and a second amplitude modulation detecting means coupled to said second output of said discriminator, means for coupling a first sound transducer to the output of said first amplitude modulation detector and a second sound transducer coupled to the output of said second amplitude modulation detector.

3. In a transmission system as set forth in claim 1, means for producing a frequency response in said amplitude and frequency modulated carrier wave like that produced by overcoupled parallel resonant circuits.

4. In a transmitter for signals L and R comprising means for producing at one output an $L+R$ signal and at another output an $L-R$ signal, means for amplitude modulating a carrier wave in accordance with said $L+R$ signal, means for inversely varying the amplitude of said $L-R$ signal with respect to the amplitude variations of said carrier wave thereby providing a modified $L-R$ signal, and means for varying the frequency of the carrier wave in accordance with the modified $L-R$ signal.

5. A transmitter for signals L and R comprising a matrix having two inputs to which the L and R signals may be respectively applied, a first output at which an $L+R$ signal is produced and a second output at which an $L-R$ signal is produced, means for amplitude modulating a carrier wave with said $L+R$ signal, a balanced modulator compensator having two inputs and an output, means for applying the $L-R$ signal to one of said latter inputs and means for applying at least a portion of said $L+R$ signal to the other of said latter inputs so as to produce a modified $L-R$ signal at said latter output, means for frequency modulating said carrier wave in accordance with said modified $L+R$ signal whereby the frequency swing of said carrier wave varies inversely as its amplitude.

6. A transmitter as set forth in claim 5 wherein there is an antenna and a coupling means for applying the amplitude and frequency modulated carrier wave to said antenna, the frequency response of said coupling means having a peak on either side of the carrier frequency so as to compensate for the single peaked frequency response characteristics of amplitude modulation receivers and hence prevent their outputs from being distorted by the frequency modulation components of the carrier wave.

References Cited in the file of this patent

UNITED STATES PATENTS

| | | |
|---|---|---|
| 2,363,650 | Crosby | Nov. 28, 1944 |
| 2,429,762 | Koch | Oct. 28, 1947 |
| 2,698,379 | Boelens et al. | Dec. 28, 1954 |
| 2,903,518 | Kahn | Sept. 8, 1959 |